US008923843B2

(12) United States Patent
Karimi et al.

(10) Patent No.: US 8,923,843 B2
(45) Date of Patent: Dec. 30, 2014

(54) DISTRIBUTED MULTI-RADIO TRANSMISSION DIVERSITY

(75) Inventors: Hamid Reza Karimi, Swindon (GB); Louis Gwyn Samuel, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 2284 days.

(21) Appl. No.: 11/617,101

(22) Filed: Dec. 28, 2006

(65) Prior Publication Data

US 2008/0161002 A1 Jul. 3, 2008

(51) Int. Cl.
*H04W 24/00* (2009.01)
*H04B 7/02* (2006.01)

(52) U.S. Cl.
CPC .................................... *H04B 7/022* (2013.01)
USPC .......................................... 455/423; 370/252

(58) Field of Classification Search
CPC .......................... H04W 24/10; H04W 72/0406
USPC .................................. 370/428, 252; 455/423
See application file for complete search history.

(56) References Cited

U.S. PATENT DOCUMENTS

| | | | | |
|---|---|---|---|---|
| 6,070,084 | A | 5/2000 | Hamabe | |
| 6,195,552 | B1 | 2/2001 | Jeong et al. | |
| 6,856,805 | B1 * | 2/2005 | Raaf | 455/436 |
| 7,848,354 | B2 | 12/2010 | Naka | |
| 2003/0017838 | A1 * | 1/2003 | Kayama et al. | 455/525 |
| 2003/0119505 | A1 * | 6/2003 | Jou et al. | 455/434 |
| 2004/0223507 | A1 * | 11/2004 | Kuchibhotla et al. | 370/428 |
| 2007/0155377 | A1 * | 7/2007 | Horiguchi et al. | 455/422.1 |

FOREIGN PATENT DOCUMENTS

| | | | |
|---|---|---|---|
| JP | 2003198460 | A | 7/2003 |
| WO | 0171521 | A1 | 9/2001 |
| WO | 03081938 | A1 | 10/2003 |
| WO | 2004042954 | A1 | 5/2004 |

OTHER PUBLICATIONS

International Search Report and Written Opinion of the International Searching Authority for International Application No. PCT/US2007/025900 mailed May 20, 2008.

"Generic Link Layer: A Solution for Multi-Radio Transmission Diversity in Communication Networks Beyond 3G," by Konstantinos Dimou, Ramon Aguero, Marcin Bortnik, Reza Karimi, Georgios P. Koudouridis, Stephen Kaminski, Horst Lederer, Joachim Sachs; 0-7803-9152-7/05, pp. 1672-1676.

XP-002337899, Sixth Framework Programme, Priority 1st-2002-2.3.1.4, Mobile and Wireless Systems byond 3G, Project 507134, WWI Ambient Networks, D 2.2 MRA Architecture, pp. 1(70)-69(70).

* cited by examiner

*Primary Examiner* — Christopher M Brandt
*Assistant Examiner* — Joseph Dean, Jr.
(74) *Attorney, Agent, or Firm* — Carlson, Gaskey & Olds

(57) ABSTRACT

A method of communicating provides multi-radio transmission diversity (MRTD). A base station receives downlink measurement reports from a mobile station regarding each of a plurality of downlinks between the mobile station and a plurality of base stations. The base station determines which of the base stations will transmit a selected transmission to the mobile station responsive to the received downlink measurement reports. The base station later receives an acknowledgement from the mobile station receiving the selected transmission. In a disclosed example, each of a plurality of base stations receives the downlink measurement reports. Each of the base stations determines, independent of the other base stations, which of the base stations will transmit the selected transmission.

14 Claims, 1 Drawing Sheet

20 30 50 70 50 70 70 60 50 24 26 28 54 52 54 52 72 72 74 64 74 62 72 52 54 32 74 34

DISTRIBUTED MULTI-RADIO TRANSMISSION DIVERSITY

TECHNICAL FIELD

This invention generally relates to communication. More particularly, this invention relates to wireless communications.

DESCRIPTION OF THE RELATED ART

Wireless communication systems are often referred to as cellular communication systems because of the manner in which geographic regions are divided into cells. A base station transceiver is typically situated within each cell to provide wireless communication coverage within a corresponding area. Such arrangements have been used for voice communications and more recently for a variety of different types of data communications. With the increased usage of wireless communications, it has become challenging to continuously meet new demands for wireless communication subscribers.

One technique intended to increase the efficiency of wireless communication systems is known as multi-radio transmission diversity (MRTD). A number of radio access points such as a plurality of base stations are connected to each other using reliable, high-speed links so that the base stations can share information regarding mobile stations. Each mobile station provides one downlink channel measurement report to each base station on a corresponding uplink between the base station and the mobile station. The base stations then share this information over the reliable, high speed links and they collectively perform a joint-scheduling for a plurality of mobile stations communicating with the plurality of base stations.

Using MRTD allows for transmitting a user's data in a sequential, switched manner or a simultaneous, parallel manner using the different radio accesses. In the case of switched MRTD, a user's data is transmitted from one radio access at any transmission time interval.

Once a mobile station correctly decodes a received downlink transmission from one of the base stations, the mobile station responds with an acknowledgement to that base station on a corresponding uplink. That base station then shares the acknowledgement information with the other base stations over the high-speed link between the base stations.

Such a centralized MRTD approach allows for maximizing throughput using a known allocation strategy for allocating different transmissions to different mobile stations from the different base stations.

One drawback associated with known MRTD approaches is that they require a high speed link between the base stations. This introduces additional expense into a network for the purpose of sharing the information among the base stations. It is desirable to reduce the cost of wireless communication networks. Therefore, it would be useful to avoid the requirement for such high speed links.

Additionally, it is challenging to share information among the base stations in a timely manner to ensure correct operation of a centralized MRTD scheme. It is possible, for example, for channel quality information to become out-of-date if there is any significant delay in the communication among the base stations. For example, if the mobile station is moving at a speed of 3 kilometers per hour, the channel coherence time is 180 milliseconds in a 2 GHz band. Accordingly, sharing the information between base stations must occur very quickly and accurately.

It would be useful to be able to exploit the benefits of MRTD without requiring the links and communications between base stations.

SUMMARY

An exemplary method of communicating using multi-radio transmission diversity includes receiving, at a base station, downlink measurement reports from a mobile station regarding each of a plurality of downlinks between the mobile station and a plurality of base stations. A determination is made at the base station which of the base stations will transmit a selected transmission to the mobile station. This determination is made responsive to the received downlink measurement reports. An acknowledgement from the mobile station regarding receipt of the selected transmission is received at the base station.

In one example, the downlink measurement reports are received at each of the plurality of base stations corresponding to the downlink measurement reports from the mobile station. The determination regarding which of the base stations will transmit the selected transmission is made at each of the base stations independent of the other base stations.

The disclosed example technique allows for realizing the advantages of MRTD without the drawbacks associated with requiring communications between the base stations.

The various features and advantages of the disclosed example will become apparent to those skilled in the art from the following detailed description. The drawings that accompany the detailed description can be briefly described as follows.

DETAILED DESCRIPTION

Figure 1:
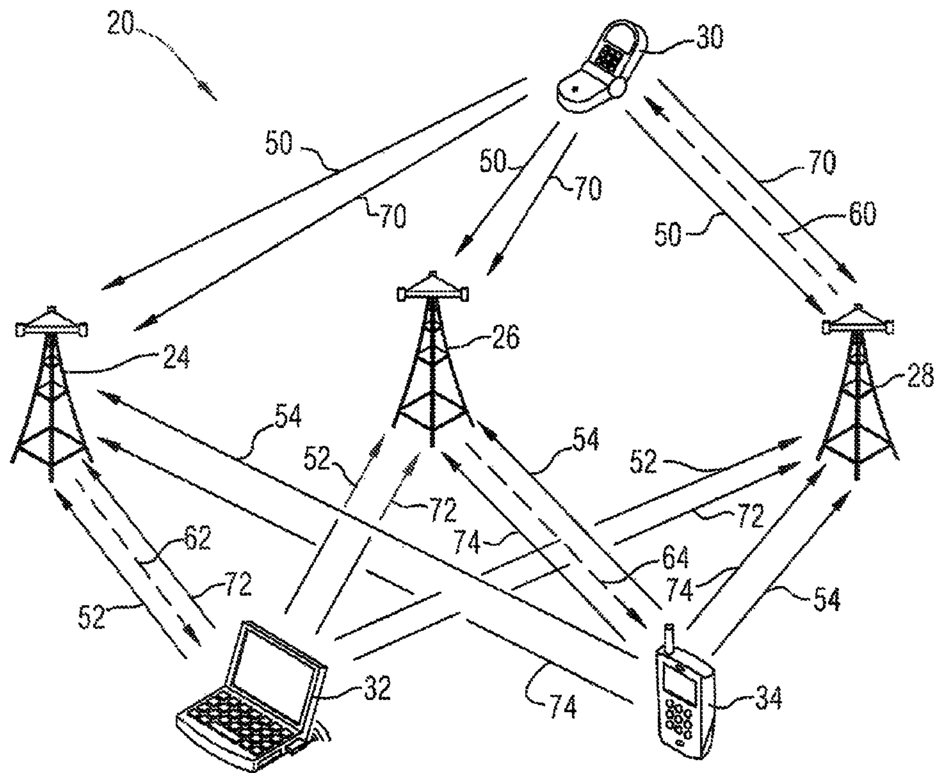
FIG. 1 schematically illustrates selected portions of a wireless communication system that is useful with an embodiment of this invention.

FIG. 1 schematically shows selected portions of a wireless communication system 20. A plurality of radio access points that comprise base stations 24, 26 and 28 provide wireless communication coverage over a selected area. The example base stations need not be of the same type. A plurality of mobile stations 30, 32 and 34 are useful for a variety of types of wireless communications. The mobile stations may be using one or more interfaces or waveforms and one mobile station can use a different one than another.

In the illustrated example, each of the mobile stations 30, 32 and 34 includes each of the base stations 24, 26 and 28 in an active set for the mobile station. In one example, the active set includes multi-radio transmission diversity (MRTD) candidate base stations with which the corresponding mobile station can communicate. In one example, at least one of the base stations 24, 26 or 28 may not be in the active set of one or more of the mobile stations 30, 32 and 34.

Each mobile station performs a channel quality measurement regarding the mobile station and each of the base stations 24, 26 and 28. For example, the mobile station 30 performs downlink channel quality measurements or otherwise detects a pilot or similar beacon channel of the base stations. The mobile station 30 reports each of those measurements to each of the base stations as schematically shown at 50. The downlink measurement reports 50 include information regarding the downlinks between each of the base stations 24, 26 and 28 and the mobile station 30. Each of the base stations, therefore, receives a downlink measurement report regarding its own downlink with the mobile station 30 and the downlinks of the other two base stations. This is different than the traditional approach where each base station only receives a report regarding its own downlink with a mobile station.

Downlink measurement reports are used in this description in a generic sense to indicate a report regarding an downlink between a mobile station and a base station in its active set or a measurement report based on a mobile station reading a pilot or similar beacon channel of a base station that is not within its active set. The terms "downlink measurement" and "downlink measurement report" as used in this description should, therefore, not be construed in a strict sense as if they were limited to measurement reports regarding base stations in a mobile station's active set.

The mobile station 32 provides downlink measurement reports 52 regarding each of the downlinks between each base station and the mobile station 32. Similarly, the mobile station 34 provides downlink measurement reports 54 regarding each of the downlinks between the base stations 24, 26 and 28 and the mobile stations 34.

Each uplink transmissions from the mobile stations regarding downlink measurement reports can be considered a collective downlink measurement report because each includes information regarding a collection of downlinks between the corresponding mobile station and a plurality of base stations.

Figure 2:
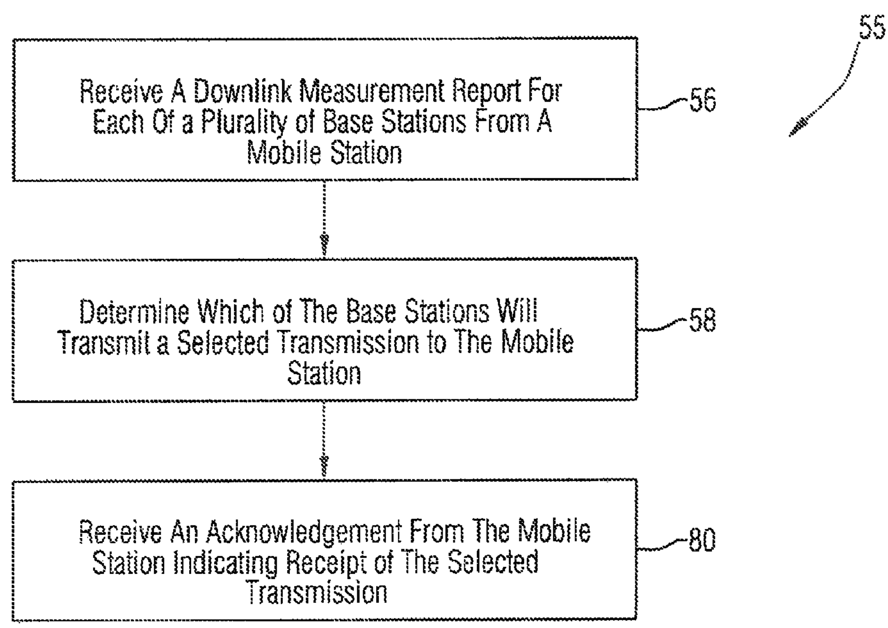
FIG. 2 is a flowchart diagram summarizing one example approach.

FIG. 2 includes a flowchart diagram 55 that summarizes one example approach for accomplishing MRTD using the base stations 24, 26 and 28 without requiring high speed links between them for sharing information among them. Each of the steps schematically shown in FIG. 2 is performed at each of the base stations independent of the other base stations in the active set (e.g., the base stations participating in MRTD). At 56, each of the base stations 24, 26 and 28 receives a downlink measurement report for each of the base stations 24, 26 and 28 from one or more mobile stations. In one example, all three base stations are in an active set for at least one of the mobile stations and at least one of the base stations is not in an active set of another one of the mobile stations. In the example of FIG. 1, all three base stations receive downlink measurement reports from all three mobile stations regarding all three downlinks to each mobile station.

At 58, the base station determines which of the base stations should transmit a selected transmission to a corresponding one of the mobile stations. In one example, each base station uses the same determination technique such that each determines the same capacity table used for deciding which of the base stations will transmit the selected transmission. One example includes using a known maximum throughput allocation strategy to pair base stations with mobile stations for the selected transmission to each mobile station. Given this description, those skilled in the art will be able to select a decision technique and to appropriately program a controller to perform the selected decision process to meet the needs of their particular situation.

The allocation of the selected transmissions among appropriate base stations is performed at each base station independent of the other base stations. Accordingly, the example approach does not require any sharing of information between the base stations, which eliminates a need for a high-speed link between them. Each base station receives a downlink measurement report from each mobile station regarding all of the corresponding downlinks associated with each mobile station. Therefore, each base station automatically has all of the information that all of the other base stations have and all are able to determine the appropriate pairings between base stations and mobile stations for selected transmission purposes.

Once this determination is made, any base station having a selected transmission allocated to it will transmit that to the corresponding mobile station. In the example of FIG. 1, the base station 28 transmits a selected transmission 60 to the mobile station 30. The base station 24 transmits a selected transmission 62 to the mobile station 32. The base station 26 transmits a selected transmission 64 to the mobile station 34.

Once each mobile station successfully decodes a received, selected transmission, that mobile station provides an acknowledgement of such receipt. In the example of FIG. 1, the mobile station 30 provides an acknowledgement 70 regarding the successful receipt. The acknowledgement 70 is provided to each of the base stations even though only one of them actually provided the selected transmission 60. Similarly, the mobile station 32 provides an acknowledgement 72 to all base stations in its active set. The mobile station 34 provides an acknowledgement 74.

As shown at 80 in FIG. 2, each base station receives an acknowledgement from the mobile station indicating receipt of the selected transmission. Each base station, therefore, is able to determine whether the selected transmission can be removed from its buffer responsive to a successful receipt by the intended mobile station. This differs from a traditional arrangement where an acknowledgement was only sent from a mobile station to the base station responsible for the transmission. By providing an acknowledgement to all base stations in a mobile station's active set, each of those base stations is able to independently determine the status of the receipt of that selected transmission. Again, this eliminates the need for sharing information between the base stations over a dedicated, high speed link.

The illustrated example includes a feature for avoiding having one of the base stations make an improper allocation of a selected transmission based upon an erroneously decoded downlink measurement report from a mobile station. One example includes using an error detecting technique such as a cyclic redundancy check. In the event that one of the base stations erroneously decodes a downlink measurement report from a mobile station, that base station is at least temporarily removed from that mobile station's active set. Such a base station will not participate in MRTD for that mobile station for subsequent selected transmissions until that base station is able to correctly decode downlink measurement reports from that mobile station. This ensures that the joint scheduling independently performed at each base station will be consistent and will not result in different channel state tables.

The illustrated example also includes a technique for dealing with potentially erroneously decoded acknowledgements at any of the base stations. One example includes using a cyclic redundancy check for determining if there is an error associated with decoding an acknowledgement from a mobile station. If such an error occurs at a base station, that base station is removed from the active set of the corresponding mobile station for at least the next transmission time interval.

In one example, each mobile station regularly transmits the acknowledgement for any successfully decoded packet up until the time of successfully decoding a next received packet. In one example, the repeated acknowledgements are appended to the collective downlink measurement reports from the mobile station. With this technique, the additional overhead required for the regularly, repeatedly acknowledgements can be minimized because the mobile stations will be regularly providing the collective downlink measurement reports already.

The example technique of using signaling on the radio uplink between mobile stations and multiple base stations removes a need for high speed links between base stations for sharing information among them. MRTD is still possible and the example allows for significantly reducing backhaul costs and network capital expenditures.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating using multi-radio transmission diversity, comprising the steps of:

receiving, at a base station, downlink measurement reports from a mobile station regarding each of a plurality of downlinks between the mobile station and a plurality of base stations;

determining, at the base station, which of the base stations will transmit a selected transmission to the mobile station responsive to the received downlink measurement reports; and receiving an acknowledgement from the mobile station indicating the mobile station received the selected transmission.

2. The method of claim 1, comprising receiving the downlink measurement reports at each of the plurality of base stations; and determining which of the base stations will transmit the selected transmission at each of the base stations, independent of the other base stations.

3. The method of claim 1, comprising receiving the downlink measurements from each of a plurality of mobile stations, respectively; and determining, at each of the base stations, which of the base stations will transmit a selected transmission to each of the mobile stations, respectively.

4. The method of claim 1, comprising determining whether there is an error associated with the received downlink measurements at each of the base stations; and at least temporarily removing a base station from an active set for the mobile station responsive to determining that there is an error.

5. The method of claim 1, comprising receiving the acknowledgement at each of the plurality of base stations subsequent to the mobile station receiving the selected transmission from the determined base station.

6. The method of claim 1, comprising removing data corresponding to the selected transmission from a buffer at any one of the base stations that successfully receives the acknowledgement.

7. The method of claim 1, comprising determining whether there is an error associated with the received acknowledgement; and at least temporarily removing a base station from an active set for the mobile station responsive to determining that there is an error.

8. The method of claim 1, comprising repeatedly receiving the acknowledgement at least until a next subsequent transmission is scheduled for the mobile station.

9. The method of claim 8, comprising receiving the acknowledgement with the received downlink measurement reports.

10. A method of communicating using multi-radio transmission diversity, comprising the steps of:

transmitting a collective downlink measurement report regarding each of a plurality of downlink measurements from a mobile station to each of a plurality of base stations;

receiving a transmission from at least one of the plurality of base stations; and transmitting an acknowledgement of the received transmission to each of the plurality of base stations.

11. The method of claim 10, comprising repeatedly determining a quality of the downlink channel of each of the plurality of base stations; and transmitting each determined quality as the collective downlink measurement report.

12. The method of claim 10, comprising repeatedly transmitting the acknowledgement to each of the plurality of base stations at least until receiving a next transmission from at least one of the base stations.

13. The method of claim 12, comprising transmitting the acknowledgement with the transmitted collective downlink measurement report.

14. The method of claim 10, wherein a number of downlinks in the collective downlink measurement report equals a number of base stations in the plurality of base stations.

* * * * *